March 12, 1929.                P. WEISS                1,705,383

COMBUSTION CHAMBER FOR USE WITH POWDERED FUEL

Filed April 8, 1925

INVENTOR.
Paul Weiss
By O'Neill and Bunn
ATTORNEYS.

Patented Mar. 12, 1929.

1,705,383

UNITED STATES PATENT OFFICE.

PAUL WEISS, OF PARIS, FRANCE, ASSIGNOR TO SOCIÉTÉ DES MINES DE FRANKENHOLZ, OF PARIS, DEPARTMENT OF THE SEINE, FRANCE.

COMBUSTION CHAMBER FOR USE WITH POWDERED FUEL.

Application filed April 8, 1925, Serial No. 21,498, and in France April 17, 1924.

The present invention relates to a combustion chamber adapted for burning powdered fuel, the capacity of which is considerably less than that necessary with combustion chambers as ordinarily constructed and designed to consume the same quantity of fuel per hour. In addition to the reduced cost of installation and maintenance, the combustion chamber according to the present invention enables a regular and complete combustion of the fuel and an easy removal of the ashes to be effected, and it prevents liquefaction of the scoria on the walls of the combustion chamber whilst at the same time enabling a certain proportion of the calories usually lost to be recovered.

A combustion chamber according to the present invention comprises a central chamber into which one or more elongated passages of or lined with refractory material with burners at the bases enter, said passages being of such length that combustion is completed during the passage of the fuel therethrough.

The combustion chamber may be furnished with containers through which cooling fluid is circulated for the purpose of recovering the calories that might, otherwise, be lost and for facilitating the precipitation of the ash.

In order that the invention may be clearly and readily understood, reference will now be made to the accompanying drawings which show diagrammatically two forms of embodiment of the invention, one of them being applied to a steam generator, and on which:

Figure 1:
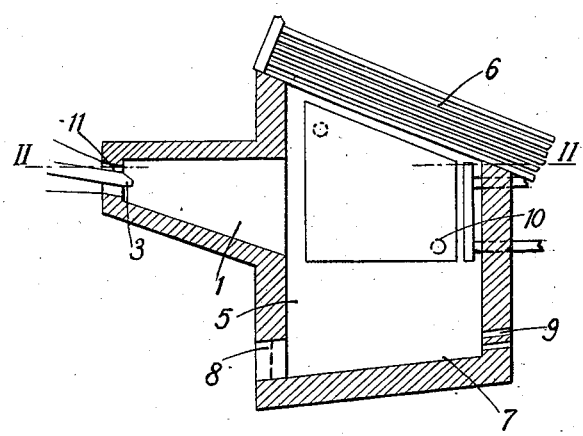
Fig. 1 is a sectional elevation of one form of my invention, along the line I—I of Fig. 2, and Fig. 2 a section on the line II—II of Fig. 1.

The combustion chamber shown comprises two elongated passages 1, 2 lined with refractory material with burners 3, 4 respectively, located at their outer ends. The passages 1, 2 enter a central chamber 5 of reduced volume arranged below the tubes 6 of the steam generator. The lower portion of the chamber 5 forms an ashpit and has an inclined bottom 7, an ash door 8, and air holes 9 for the purpose of producing the current of air required for the rapid cooling of the ashes.

Containers 10 having a large surface may also be arranged against the walls of the chamber 5 at the level at which the elongated passages 1, 2 enter. These containers may be traversed by a cooling fluid, such as water, air, steam.

The pulverized fuel suspended in air is introduced by the burners 3, 4 additional air also entering through the adjustable openings 11, 12 surrounding the burners.

The internal walls of the passages 1, 2 are of refractory material and becoming highly heated act on the combustible mixture issuing from the burners, thereby producing its ignition and extremely rapid combustion.

The length of the passages is such that combustion of the fuel is completed during its passage therethrough and before it enters the central chamber 5. For this reason, the chamber 5 may be made much smaller than ordinary combustion chambers for powdered fuel.

The containers 10, when provided, are acted on by very hot gases issuing from the passages 1, 2. The heat radiated directly by the particles of ash contained in the hot gases is absorbed by the containers 10 and their contents with the result that the particles of ash conglomerate, solidify and finally fall to the bottom of the chamber.

The air admitted through the air holes 9 maintains the lower portion of the chamber at a relatively low temperature, thereby avoiding clinkering and facilitating the removal of the ash.

Figure 2:
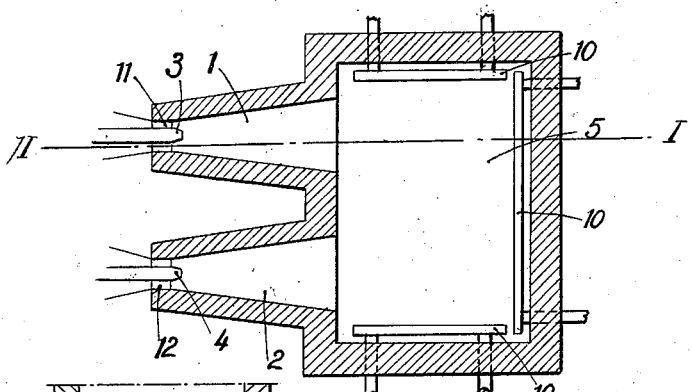

The containers 10 having a large surface may act as reheaters or evaporators of water, superheaters of steam or reheaters of air according to the nature of the fluid flowing therethrough, through the inlet and outlet ports indicated in Figs. 1 and 2. They may also consist of groups of tubes; this is a form which is economically realizable.

Figure 3:
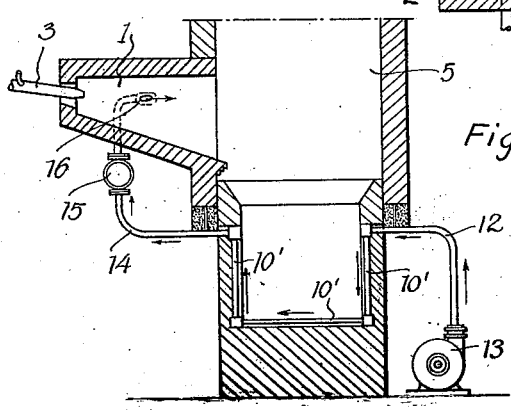
Fig. 3 is a sectional elevation of the second form of embodiment.

Such a construction is shown in Fig. 3.

In this form of embodiment the containers 10'—10' are placed at the bottom part of the combustion chamber 5 and they are made of tubes as shown. A blower 13 is provided connected to a delivery pipe 12 connected to the containers 10'. A pipe 14 leads from the containers 10' and the heated air passes through a regulating valve 15 to the opening 16 issuing in the part 1 of the combustion chamber as well as in the part 2, Fig. 2.

The above disposition of the containers 10' is particularly to be recommended when the pulverized coal is poor in volatile matters. Of course, the containers 10' could be made in any convenient arrangement of rows of pipes.

I claim:

In a pulverized fuel furnace for a boiler, a main boiler heating chamber, a plurality of combustion tubes leading to the main chamber, pulverized fuel and air admission means for the combustion tubes, said tubes being of sufficient capacity to permit complete combustion therein, cooling air means lining the walls of the main chamber and means for conducting the heated air to the combustion tubes to assist in promoting combustion.

In testimony whereof I affix my signature.

PAUL WEISS.